United States Patent [19]

Boaz

[11] 4,023,945
[45] May 17, 1977

[54] METHOD OF TEMPERING GLASS HAVING OPENINGS THERETHROUGH

[75] Inventor: Premakaran T. Boaz, Southgate, Mich.

[73] Assignee: Ford Motor Company, Dearborn, Mich.

[22] Filed: Aug. 13, 1976

[21] Appl. No.: 714,435

[52] U.S. Cl. .................................. 65/112; 65/104; 65/105; 65/114
[51] Int. Cl.² .................. C03B 21/00; C03B 27/00
[58] Field of Search ............. 65/28, 103, 104, 105, 65/112, 113, 114, 115, 273

[56] References Cited
UNITED STATES PATENTS

| | | | |
|---|---|---|---|
| 2,237,982 | 4/1941 | Ferlito | 65/114 X |
| 3,369,883 | 2/1968 | Smith | 65/105 X |
| 3,453,097 | 7/1969 | Häfner | 65/112 |
| 3,551,234 | 12/1970 | Britton | 65/28 X |

*Primary Examiner*—Arthur D. Kellogg
*Attorney, Agent, or Firm*—William E. Johnson; Keith L. Zerschling

[57] ABSTRACT

This disclosure is directed to an improvement in the method of tempering glass sheets having at least one opening therethrough so as to reduce the breakage which occurs to such glass sheets because of the stresses set up therein during the quenching portion of a glass tempering operation. The method involves cutting a relief opening in the glass sheet from the opening in the glass sheet to an edge of the glass sheet. Thereafter the tempering operation is carried out on the glass sheet after the relief opening has been cut therein.

7 Claims, 4 Drawing Figures

METHOD OF TEMPERING GLASS HAVING OPENINGS THERETHROUGH

BACKGROUND OF THE INVENTION

Body designers for automotive companies often desire to utilize in cars tempered glass windows which have holes very close to an edge of the glass sheet. These holes are utilized for mounting the glass sheet to window regulators or other devices for moving the glass sheet in and out of a particular location in the automotive vehicle. Glass manufacturers have responded to such requests by establishing certain guidelines for a minimum tolerable distance between the edge of a glass sheet and the edge of an opening therethrough which can be manufactured using current level technology. If the edge of the opening in the glass sheet is located closer to the edge of the glass sheet than set forth by the guidelines, excessive glass breakage usually occurs during the tempering operation because of the high stress level set up in the small area of glass located between the edge of the glass and the edge of the opening closest to the edge of the glass.

It is a principal object of this invention to provide a method which permits openings to be formed through a glass sheet closely adjacent the edge of the glass sheet. It is a further object of this invention to provide a method which reduces the glass breakage associated with tempering glass sheets having openings therethrough closely adjacent an edge of the glass sheet.

The following U.S. patents were cited in a novelty search conducted in the U.S. Patent Office on this subject matter: U.S. Pat. Nos. 1,289,993; 1,645,355; 1,722,010; 1,795,308; 3,114,619; 3,369,883; 3,453,097 and 3,543,979, Japanese Pat. No. 47-44009 was also cited.

SUMMARY OF THE INVENTION

This invention relates to an improvement in the method of tempering glass sheets and, more particularly, to an improvement in the method of tempering glass sheets having at least one opening therethrough closely adjacent an edge of the glass sheets. The improved method reduces the breakage which occurs to such glass sheets because of stresses set up therein during the quenching portion of a tempering operation.

In general, in accordance with the teachings of this invention a relief opening is cut in the glass sheet from the opening therein to an edge of the glass sheet. After the relief opening has been cut from the edge of the glass sheet to the opening therein, the glass sheet is subjected to a tempering operation.

In accordance with particular embodiments of this invention, the relief opening in the glass sheet is rather narrow in its width dimension when compared to the largest dimension of the opening in the glass sheet.

In accordance with further teachings of the method of this invention, the relief opening cut in the glass sheet forms a smooth continuation of the shape of the opening in the glass sheet.

In accordance with further embodiments of this invention, the relief opening and the opening in the glass sheet may be formed in a single continuous operation.

DESCRIPTION OF THE PREFERRED EMBODIMENTS

Figure 1:
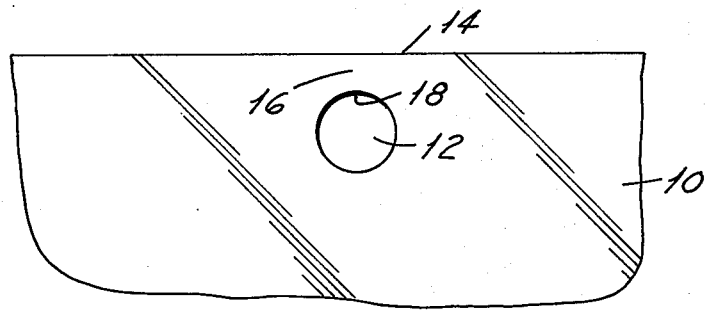
FIG. 1 is a partial view of a glass sheet having an opening therein.

In FIG. 1 there is seen a glass sheet 10 having an opening 12 therethrough closely adjacent an edge 14 of the glass sheet. A small zone 16 of glass exists between the edge 14 and a portion 18 of the annular edge formed by the opening 12.

During a glass tempering operation, which is carried out in many of the ways well known in the art, if the small zone 16 of the glass sheet 10 is to small, substantial stresses are set up therein causing the glass sheet 10 to fracture in this particular zone and to ruin the finished article. If the glass fractures in this small zone, the fractures continue throughout the glass and destroys the same.

Figure 2:
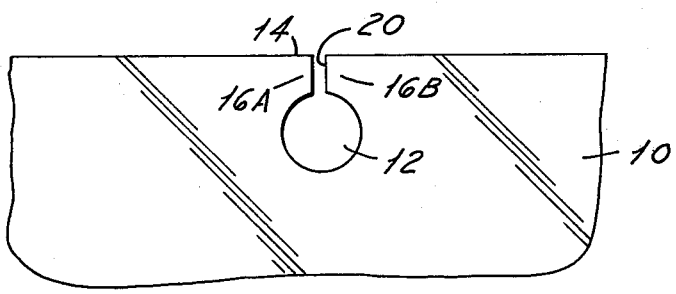
FIGS. 2, 3 and 4 are tempered glass sheets having openings therein closely adjacent an edge thereof formed in accordance with the teachings of various preferred embodiments of the method of this invention.

In accordance with the teachings of this invention, as is best seen in FIG. 2, a relief opening 20 is cut from the edge 14 of the glass sheet 10 to the opening 12 in the glass sheet. By cutting such a slot, the small zone 16 is separated into even smaller zones 16A and 16B which are separated from one another by the relief opening 20. Now when the glass sheet 10 is subjected to a tempering operation, the stresses are not developed in the zone 16 but rather are developed in smaller zones 16A and 16B which have the ability to react therewith because they are independent from one another. Thus, the glass sheet 10 may safely be tempered to produce an article having an opening 12 therein. The provision of the relief opening 20 is sufficient to compensate for the stress buildup in the small zone 16. For example, if the opening 12 has a diameter of 0.5 inches and the thickness of the glass is 0.25 inches and if the nearest portion of the opening 12 is placed within 0.25 inches of the edge 14 of the glass, the relief opening 20 should have a thickness of approximately 0.125 inches in order to be sufficient to eliminate the undesirable stress buildup in the small zone 16 which will cause fracture of the glass.

Figure 3:
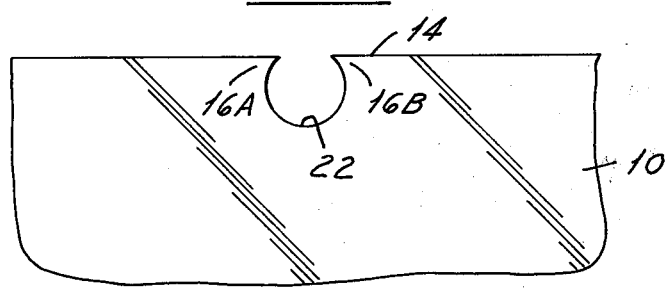

In FIG. 3 there is seen an alternate to the method of this invention. In this particular situation, an opening 22 is formed in the glass sheet 10. The opening 22 is formed so that its configuration blends smoothly out from the opening into engagement with the edge 14 of the glass sheet. This formation defines once again two small separated zones 16A and 16B which isolate the stresses encountered in a glass tempering operation thereby providing the necessary protection against the possibility of shattering during tempering. The opening 22 may be formed in a single operation or may be formed by initially drilling a smaller opening and then forming a larger opening.

Figure 4:
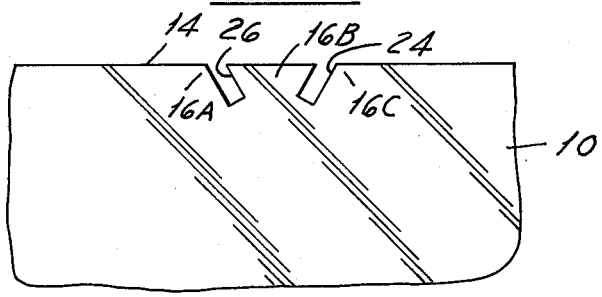

FIG. 4 shows another alternative of the method of this invention wherein slots 24 and 26 are cut into the glass providing isolated zones 16A, 16B and 16C which do not developed sufficient stresses upon tempering to cause a shattering of the glass. The slots 24 and 26 may be formed in a single operation or in two operations.

There has been disclosed herein a method for tempering glass sheets having openings therein. Many obvious modifications of this method will be apparent to those skilled in the art upon reading this specification. It is intended that all such modifications be included within the scope of these claims appended.

What I claim is:

1. A method of obtaining a high yield of tempered glass articles having at least a single opening therethrough which comprises the steps of:
   cutting the shape of the article to be formed from a glass sheet;
   cutting an opening in the glass sheet, said opening being surrounded by the glass sheet;
   cutting a relief opening in the glass sheet from the opening in the glass sheet to an edge of the glass sheet; and
   tempering the glass sheet having the opening and relief opening therein.

2. The improvement in the method of tempering glass sheets having at least one opening therethrough to reduce the breakage which occurs to such glass sheets because of stresses set up therein during the quenching portion of a tempering operation which comprises:
   cutting a relief opening in the glass sheet from the opening in the glass sheet to an edge of the glass sheet, and
   tempering the glass sheet after the relief opening has been cut therein from the opening in the glass sheet to the edge of the glass sheet.

3. The method of claim 2 wherein: said relief opening cut in the glass sheet is rather narrow in its width dimension when compared to the largest dimension of the opening in the glass sheet.

4. The method of claim 2 wherein: said relief opening cut in the glass sheet forms a smooth continuation of the shape of the opening in the glass sheet.

5. The method of claim 2 wherein: said relief opening cut in the glass sheet is a continuation of the sides of the opening formed in the glass which extend towards the edge of the glass sheet.

6. The method of claim 4 wherein: the opening and relief opening of the glass sheet are formed in a single continuous operation.

7. The method claim 5 wherein: the opening and the relief opening of the glass sheet are formed in a single continuous operation.

* * * * *